United States Patent [19]

Thorne et al.

[11] Patent Number: 4,978,133

[45] Date of Patent: Dec. 18, 1990

[54] TRAILER HITCH SHOCK ABSORBER

[76] Inventors: Rexford M. Thorne, 4931 S. Center; David G. Edleman, 715 S. Grant, both of Casper, Wyo. 82601

[21] Appl. No.: 428,959

[22] Filed: Oct. 30, 1989

[51] Int. Cl.$^5$ .............................................. B60D 1/00
[52] U.S. Cl. ................................... 280/484; 280/486; 267/138
[58] Field of Search ............ 267/138, 139, 141, 141.1, 267/153; 280/483, 484, 485, 486, 487; 384/125, 223, 421, 422, 425, 426, 427

[56] References Cited

U.S. PATENT DOCUMENTS

| | | | |
|---|---|---|---|
| 2,551,709 | 1/1948 | Skinner | 267/138 |
| 3,809,172 | 5/1974 | Hendrickson | 267/141 X |
| 3,904,226 | 9/1975 | Smalley | 280/486 |
| 4,077,650 | 3/1978 | Leach, Jr. | 280/484 X |
| 4,268,040 | 5/1981 | Bainard | 384/425 X |
| 4,471,973 | 9/1984 | Beckmann, Sr. | 280/483 R |

Primary Examiner—Charles A. Marmor
Assistant Examiner—Victor E. Johnson
Attorney, Agent, or Firm—Nies, Kurz, Bergert & Tamburro

[57] ABSTRACT

A trailer hitch adapter is provided for connection either to a trailer hitch ball or to a trailer hitch tongue. The adapter includes a tubular member that defines a housing and a connecting member carried within the housing between a pair of resilient elements to absorb axial shocks and rotational loads imparted by one of the towed vehicle or the towing vehicle to the other vehicle. The adapter is removably connected with a portion of the trailer hitch by means of a pair of retaining pins, to permit its removal and transfer from one vehicle to another, and also to prevent an unauthorized connection of a towed vehicle to a trailer.

9 Claims, 3 Drawing Sheets

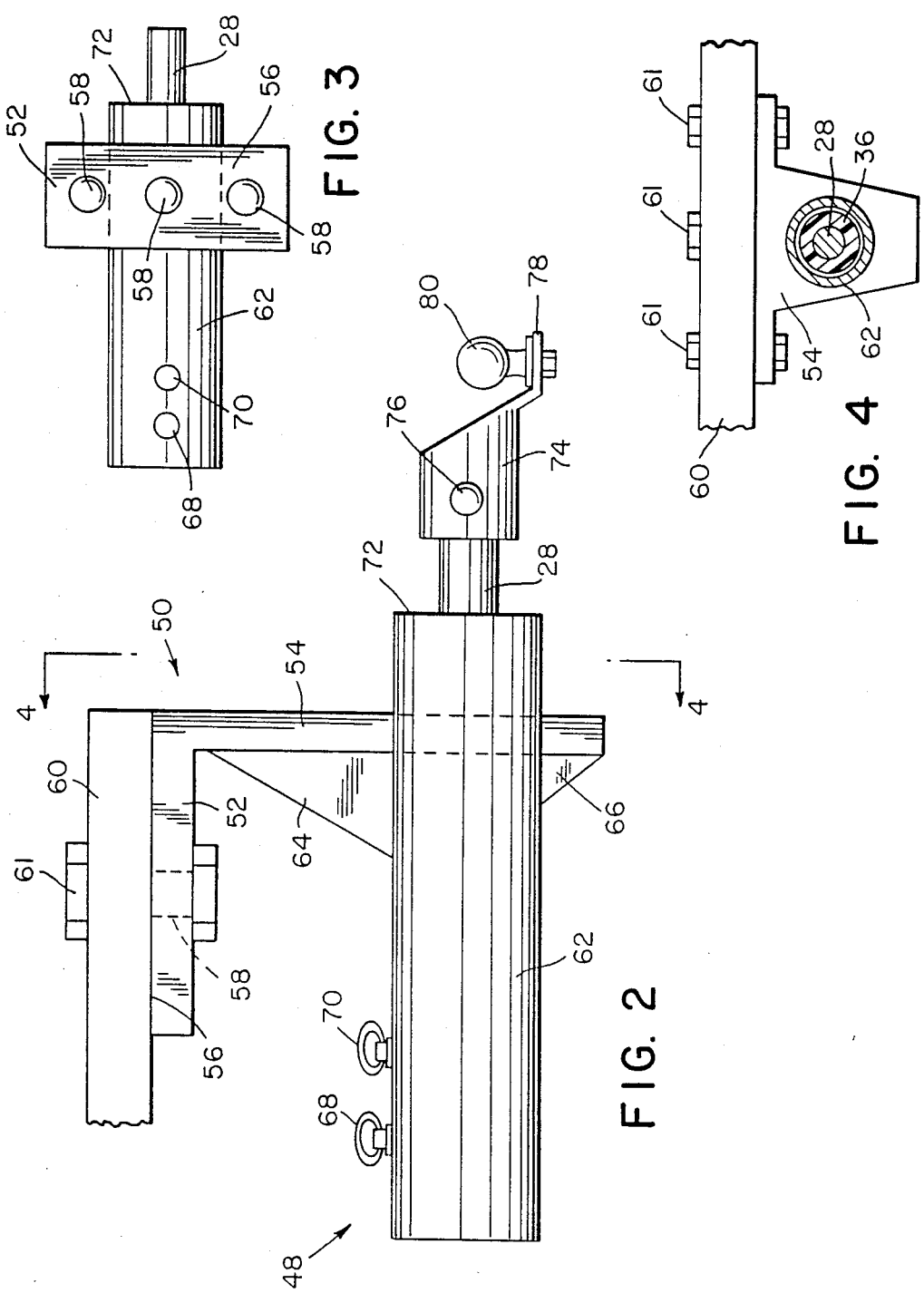

TRAILER HITCH SHOCK ABSORBER

BACKGROUND OF THE INVENTION

1. Field of the Invention

The present invention relates to a shock absorber for use with a trailer hitch assembly, and more particularly to a removable shock absorber for absorbing both gradual and sudden fore-and-aft loads and shocks normally transmitted between a towing vehicle and a towed vehicle, and also for permitting relative rotation between the two parts of a trailer hitch connection. The invention can be used in conjunction with either part of a trailer hitch arrangement, either as part of the trailer hitch and ball connection carried by a towing vehicle, or as part of a drawbar having a ball socket connection carried by a towed vehicle.

2. Description of the Related Art

Trailer hitches of a type for towing a trailer from a car or truck are available in numerous configurations. Most commonly, the towing vehicle includes a trailer hitch that is rigidly secured to the towing vehicle frame, and that carries a towing ball connection that is adapted to engage with a ball receptacle or socket that is secured to the towed vehicle. The commonly available structure includes a ball that is rigidly connected relative to the frame of the towing vehicle, and a ball receptacle is rigidly connected to and carried by the towed vehicle. As a consequence, the hitch connection between the towing vehicle and the towed vehicle is a rigid connection, and therefore any fore-and-aft loads that result upon startup or slowdown of the towing vehicle are transmitted directly to and from the towed vehicle and the towing vehicle, with the result that the towing vehicle is subjected to jerking movements that result from the loads encountered upon starting and stopping. It also results in transfer of any jerking motions of the towed vehicle resulting when that vehicle passes over bumps or ruts in the surface over which the vehicles are traveling.

In addition to fore-and-aft loads, conventional trailer hitches also are so configured that torque loads are directly transmitted between the towed vehicle and the towing vehicle, and therefore it is possible for one of the vehicles to cause the other vehicle to impose twisting loads at the hitch connection, and possibly even cause tipping over of one or the other of the vehicles.

Finally, conventional trailer hitches are also of such a nature that cooperating parts thereof are rigidly connected to one or the other of the towing vehicle or the towed vehicle, and when they are separated a trailer, or towed vehicle, can readily be hooked onto another towing vehicle having a similar ball connection, which makes possible unauthorized towing of such a towed vehicle, and thereby can result in theft of a trailer when it is parked.

Various proposals have been put forward to attempt to solve some of the problems that have been noted above. Specifically, several U.S. patents disclose hitch components that include rubber bushings of one configuration or another in an effort to absorb fore-and-aft loads. For example, U.S. Pat. No. 2,513,932, which issued Jul. 4, 1950, to J. H. Grube, discloses a trailer hitch that includes a ball and ball socket, and in which the ball socket is connected to a drawbar, the opposite end of the drawbar having a pair of resilient cushioning members that are received in a housing, and that are intended to absorb fore-and-aft loads that are imposed upon the drawbar.

Another arrangement whereby shocks between a towed and a towing vehicle are intended to be absorbed are disclosed in U.S. Pat. No. 2,878,036, which issued Mar. 17, 1959, to C. E. Simmons. The Simmons structure, which is also a part of a ball socket carried by a trailer, includes a cylindrical sleeve formed of resilient rubber material, as well as a circular ring, the circular ring serving to absorb axial loads and the tubular sleeve serving to absorb transverse loads.

U.S. Pat. No. 2,067,794, which issued Jan. 12, 1937, to C. G. Seyferth, shows another form of resilient trailer hitch in which a rubber bushing is provided in surrounding relationship to a shaft connected with one part of a hitch to absorb axial loads, the shaft being slidably guided for axial movement in bearings carried by a housing within which the bushing is retained.

In addition to the foregoing patents directed to axial and transverse loads, U.S. Pat. No. 3,169,783, which issued Feb. 16, 1965, to H. C. Harbers et al., discloses a trailer hitch structure in which a portion of a drawbar is essentially embedded in a resilient rubber bushing material, the drawbar having a substantially cylindrical shank and including opposed recesses formed in its outer surface. The bushing surrounds the shank and extends into the opposed recesses to grip the shank, the bushing and shank connection serving to absorb torsional loads resulting from rotation about its axis of an eye bolt carried as part of a drawbar hitch assembly.

Although the prior art devices identified above have been directed to absorbing loads that are transmitted between a towing vehicle and a towed vehicle, each of the proposals and structures is of a complex, and therefore expensive, nature, and, moreover, the proposals set forth in those patents do not completely solve the problems that have been posed above.

Accordingly, it is an object of the present invention to provide a trailer hitch assembly that absorbs both fore-and-aft and torsional loads that are transmitted between a connecting hitch assembly between a towing vehicle and a towed vehicle.

It is a further object of the present invention to provide a shock absorber for a towing hitch assembly wherein the shock absorber is of a simple and inexpensive construction, and is one that can be readily mass produced at a reasonable cost.

A still further option of the present invention is to provide a shock absorber for a trailer hitch assembly, wherein the shock absorber can be installed either on the towing vehicle or on the towed vehicle.

A still further object of the present invention is to provide a shock absorber for a trailer hitch assembly wherein the shock absorber and hitch connection is readily removable and reconnectable, in order to reduce the opportunity for theft of a parked trailer.

Another object of the present invention is to provide a shock absorber for a trailer hitch assembly in which the shock absorber can be easily removed and carried and installed on other vehicles having a shock absorber receiving connection, either on the towing vehicle or on the towed vehicle.

Still another object of the present invention is to provide a simple shock absorber unit for use on a trailer hitch assembly wherein the unit is substantially sealed and requires no maintenance and no lubrication.

SUMMARY OF THE INVENTION

Briefly stated, in accordance with one aspect of the present invention, a trailer hitch adapter is provided to enable rotation at a trailer hitch connection and to absorb shocks caused by sudden changes in fore-and-aft loads on the hitch. The adapter includes an elongated connecting member having a longitudinal axis and a first end adapted to be connected with one of a coupling ball and a coupling-ball-receiving socket, and having a second end spaced from the first end along the longitudinal axis. The connecting member includes an intermediate, laterally outwardly extending projection having a larger radial dimension than the connection member and defining a pair of axially spaced contact surfaces that are inclined relative to the housing longitudinal axis. First and second resilient, tubular bushing bodies are carried by the elongated connecting member, each bushing body having an inner end and an outer end, the inner ends of each bushing body positioned adjacent one contact surface of the outwardly extending projection of the connecting member. The first bushing body has an axial length less than the axial spacing between the first end of the connecting member and the projection to define an outer end spaced axially inwardly of the first end of the connecting member, the second bushing body having an axial length greater than the axial spacing between the second end of the connecting member and the projection to define an outer end spaced axially outwardly from the second end of the connecting member.

A tubular body member is provided having stop means at each end thereof for retaining the respective bushing bodies within the tubular body member, one stop means including an opening to slidably receive a portion of the connecting member to permit the first end of the connecting member to extend outwardly of the tubular body member. The other stop means includes securing means for securing the tubular body member to one of a coupling ball and a coupling-ball-receiving socket. The connecting member is retained within the tubular body member between the resilient bushing bodies for axial rotation relative to the body member and for absorbing axial loads imposed upon the portion of the connecting member that extends outwardly of the tubular body member.

BRIEF DESCRIPTION OF THE DRAWINGS

FIG. 2 is a side view of a towing vehicle ball mount structure that incorporates a trailer hitch adapter in accordance with the present invention.

FIG. 3 is a top view of the ball mount shown in FIG. 2.

FIG. 4 is a cross-sectional view of the towing vehicle ball mount shown in FIG. 2 and taken along the line 4—4 thereof.

DESCRIPTION OF THE PREFERRED EMBODIMENTS

Figure 1:
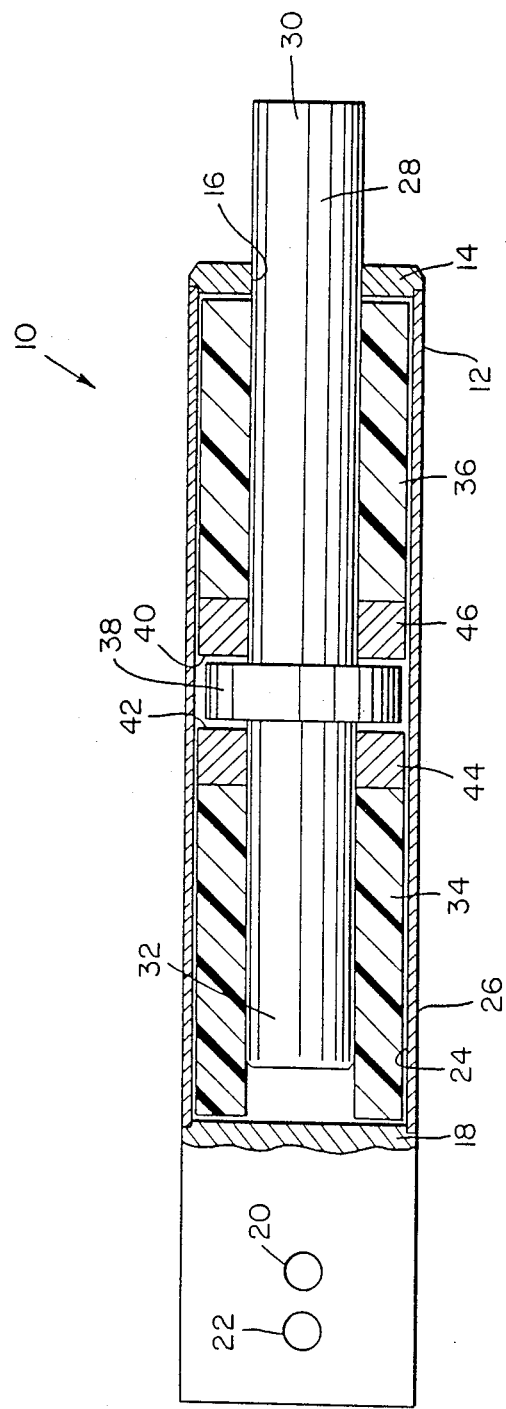
FIG. 1 is a longitudinal cross-sectional view of a trailer hitch adapter in accordance with the present invention.

Referring now to the drawings, and particularly to FIG. 1 thereof, there is shown in cross section a trailer hitch adapter 10 in accordance with the present invention, wherein the adapter includes a tubular housing or body member 12 that includes a forward end closure 14 having an aperture 16 extending therethrough, and a rear end closure 18 that extends axially from tubular housing 12 for a predetermined distance. Rear end closure 18 defines an axial extension of housing 12 that includes two axially spaced, radially extending retainer apertures 20, 22 that are adapted to each receive a cylindrical retainer pin (not shown), as will be described hereinafter in greater detail. Tubular housing 12 is preferably of cylindrical form with an annular cross section defined by an inner surface 24 and an outer surface 26, although other cross-sectional shapes than circular can also be employed, if desired. Preferably tubular housing 12 is formed from a heavy wall thickness, high strength carbon steel tube.

Positioned within tubular housing 12 and substantially coaxial therewith is an elongated member in the form of a connecting shaft 28 that has a first end 30 that extends outside of housing 12, and a second end 32 that is contained within the interior of housing 12. Connecting shaft 28 is substantially coaxial with tubular housing 12 and is preferably a solid shaft of high strength carbon steel of cylindrical configuration. Alternatively, connecting shaft can be of a tubular configuration, provided the tube wall thickness is sufficiently large to sustain the loads to which the connecting member is subjected when in use.

As shown in FIG. 1, the outer diameter of connecting shaft 28 is substantially smaller than the inner diameter of tubular housing 12 in order to permit the positioning between connecting shaft 28 and tubular housing 12 of a pair of resilient bushing bodies 34, 36 that are also of tubular configuration. Each of bushing bodies 34, 36 has an axial length that is less than one-half the axial length of tubular housing 12. Bushing body 34 is positioned with an end face adjacent rear end closure 18 and bushing body 36 is positioned with an end face adjacent forward end closure 14. Preferably, bushing bodies 34, 36 each have an inner diameter that is the same as or somewhat less than the outer diameter of the connecting shaft, so that they are held by connecting shaft 28 when the latter is in position within tubular housing 12, and each bushing body preferably has an outer diameter that is about $\frac{1}{8}$ inch less than that of the inner diameter of housing 12.

As seen in FIG. 1, bushing bodies 34, 36 are so positioned within tubular housing 12 that their respective innermost end surfaces are spaced from each other to define a gap. Also as shown in FIG. 1, connecting shaft 28 includes an outwardly projecting circular ring 38 that has an outer diameter greater than that of shaft 28, and ring 38 is concentric with the longitudinal axis of shaft 28. Outwardly projecting ring 38 has an axial length to provide sufficient strength to permit it to accommodate and withstand axial loads resulting from movement of connecting shaft 28 in an axial direction against the respective bushing bodies, and the axial length can be on the order of one-half inch or so. The outer diameter of projecting ring 38 is less than the inner diameter of tubular housing 12 in order to avoid direct metal-to-metal contact between ring 38 and housing 12. Additionally, the size of opening 16 in forward end closure 14 is preferably slightly greater than the outer diameter of shaft 28, again, to prevent or minimize as much as possible metal-to-metal contact between shaft 28 and end closure 14.

Preferably, bushing bodies 34, 36 are formed from a resilient material such as a hard natural rubber, or a urethane-based elastomeric material for toughness and for load absorption characteristics. In any event, the resilient material should be such that it can deflect in response to axial movement of connecting shaft 28 when the latter is subjected to fore-and-aft loads, but not of such high flexibility that it permits contact between second end 32 of connecting shaft 28 and rear end closure 18 of tubular housing 12 when the device is in use. In that regard, for towing of ordinary trailer vehicles having a weight of about 1200 pounds, it has been found that materials having a durometer of about 50 A would generally be suitable, although variations in that number can, of course, be accommodated.

Preferably, outwardly projecting ring 38 has a pair of axially spaced, annular bearing surfaces 40, 42 that extend generally perpendicularly to the longitudinal axis of shaft 28. Bearing surfaces 40, 42 can be spaced from the respective opposed faces of the bushing bodies by a distance of about ⅛" inches, although, again, that particular value is not critical, and the spacing can be any convenient amount.

As illustrated in FIG. 1, an especially preferred construction of the trailer hitch adapter in accordance with the present invention is such that the portions of bushing bodies 34, 36 adjacent bearing surfaces 40, 42 of projecting ring 38 are of a higher durometer value than that of the remainder of the respective bushing bodies, in order to provide a somewhat less resilient, tougher load torque bearing surface, to prevent premature wear of the respective bushing bodies as a result of rotation of the connecting shaft when in use. Thus, ring-like facing members 44, 46 can be provided between respective bushing bodies 34, 36 and bearing surfaces 40, 42.

Rear end closure 18 of tubular housing 12 includes an axially extending portion that can be received in a tubular sleeve, as will be hereinafter described.

Referring now to FIG. 2, there is shown a side view of a towing vehicle ball mount 48 incorporating a trailer hitch shock absorber in accordance with the present invention. Mount 48 includes an angle bracket member 50 defined by a pair of perpendicularly disposed connected plates 52, 54 that define a right angle, plate 52 includes a mounting surface 56 and a plurality of mounting holes 58 to permit bracket 50 to be secured to a vehicle mounting surface 60 by, for example, bolts 61. Plate 54 extends in a generally downward direction relative to vehicle surface 60, and carries a tubular sleeve or outer housing 62 that is supported by means of a plurality of gussets 64, 66 that are welded to plate 54 and to outer housing 62 to provide a firm and secure connection therebetween. Tubular sleeve 62 has an inner diameter to permit an adapter 10 of the type illustrated in FIG. 1 of the drawings to be axially slidably inserted into sleeve 62 so that the retaining apertures carried by adapter 10 are aligned with corresponding retaining apertures in the sleeve to receive a pair of retaining pins 68, 70. As shown, connecting shaft 28 of the adapter 10 extends outwardly beyond end wall 72 of sleeve 62, and it carries a towing hitch ball holder 74 that is connected to shaft 28 by means of a connecting bolt 76 that passes through ball holder 74 and through shaft 28. Extending outwardly from ball holder 74 is a connecting lip 78 to which a towing ball 80 is secured by means of a threaded shaft and nut arrangement of a type well known to those skilled in the art.

The trailer hitch ball mount illustrated in FIGS. 2, 3, and 4 provides a trailer hitch in which axial movement of connecting shaft 28 is permitted relative to tubular sleeve 62, with consequent corresponding movement of hitch ball 80 so that fore-and-aft loads transmitted between a towing vehicle and a towed vehicle are absorbed by the interaction of the outwardly projecting ring 38 carried by shaft 28, and the respective bushing bodies 34, 36 carried within housing 12. Additionally, because connecting shaft 28 is capable of rotation relative to housing 12, any torsional loads that might be transmitted between the towed vehicle and the towing vehicle can be accommodated without direct transfer of those torsional loads from one vehicle to the other. Thus, the trailer hitch arrangement illustrated in FIGS. 2 through 4 is seen to provide two degrees of freedom of movement, fore-and-aft movement and rotational movement, thereby resulting in smoother starts and safer, non-hopping stops, to thereby render trailer pulling much more smooth and effortless than with a trailer hitch including a rigid interconnection between the towed vehicle and the towing vehicle. The present invention thereby provides safer towing under varying road surface and weather conditions.

Figure 5:
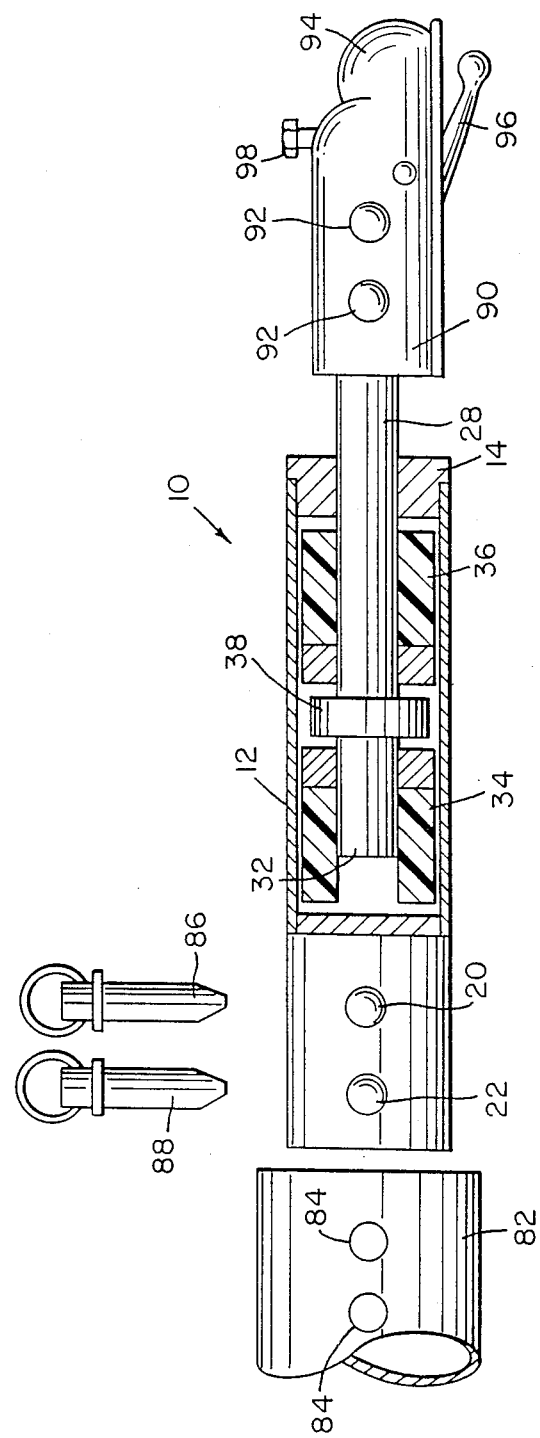
FIG. 5 is a side view, partially in section, showing in partially exploded form a trailer tongue incorporating a trailer hitch adapter in accordance with the present invention.

The adapter in accordance with the present invention can also be applied to the trailer tongue of the towed vehicle, rather than to the towing vehicle as illustrated in FIGS. 2 through 4. As shown in FIG. 5, adapter 10 is slidably received in a tubular receptacle or sleeve 82 carried by the trailer (not shown). Tubular sleeve 82 includes a pair of axially spaced, radially extending apertures 84 to receive a pair of retainer pins 86, 88 that extend through apertures 84 and into respective retaining apertures 20, 22 in adapter 10, to permit a secure and positive connection between sleeve 82 and adapter 10. The outwardly extending end of connecting shaft 28 carries a ball receptacle 90, which can be connected thereto by means of bolts 92. Ball receptacle 90 includes a ball socket 94, a pivoted ball clamp 96, and a tightening nut 98, all of which can be of a type that is well known to those skilled in the art. Thus, again, the usual fore-and-aft loads and rotational loads that might be transmitted from one of the vehicles to the other is accommodated by the hitch adapter, whether it is positioned on the trailer tongue carried by the towed vehicle, or the ball mount carried by the towing vehicle. Similarly, because of the absence of metal-to-metal contact between the tubular housing of the adapter and the connecting shaft, shocks, jars, and vibrations are cushioned by the bushing bodies carried in the adapter.

As will be apparent from the foregoing and the enclosed drawings, the hitch adapter in accordance with the present invention can be easily removed and installed, and it can also be transferred from one vehicle to another. Additionally, the easy removal of the adapter from a trailer tongue permits removal of the entire ball socket, which can help to prevent trailer theft when a trailer is parked and unattended. Thus, the separability feature of the present invention provides additional security by making it more difficult for a trailer to be connected with a towing vehicle when the trailer tongue has been removed along with the adapter of the present invention.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A trailer hitch adapter to enable rotation of a hitch-vehicle connection and to absorb shocks caused by sudden changes in fore-and-aft loads on the hitch, said adapter comprising:
   (a) an elongated connecting member having a longitudinal axis and a first end adapted to be connected with one of a coupling ball and a coupling-ball-receiving socket, and the second end spaced from the first end along the longitudinal axis, a laterally outwardly extending projection having a larger radial dimension than the connecting member and defining a pair of axially spaced contact surfaces inclined relative to the housing longitudinal axis;
   (b) first and second resilient, tubular bushing bodies carried by the elongated connecting member, each bushing body having an inner end and an outer end, the inner ends of each bushing body positioned adjacent one contact surface of the outwardly extending projection of the connecting member;
   (c) a housing for receiving the connecting member and for containing the bushing bodies, the housing having a longitudinal axis and a pair of longitudinally spaced ends and having stop means at each end thereof for retaining the respective bushing bodies within the housing, one stop means including an opening to slidably receive a portion of the connecting member to permit the first end of the connecting member to extend outwardly of the housing and to move axially and rotationally relative thereto; and
   (d) wherein and the housing is adapted to be connected with the other of said coupling ball and said coupling-ball-receiving socket, and wherein the connecting member is received within the housing between the resilient bushing bodies for rotation relative to the housing and for absorbing axial loads imposed upon the portion of the connecting member that extends outwardly of the tubular body member, the second end of the connecting member being freely received within the housing and being confined only by one of the resilient bushing bodies so that it is capable of rotation, translation, and radial movement relative to the housing longitudinal axis.

2. A trailer hitch adapter in accordance with claim 1, wherein one stop means includes connecting means for connecting the tubular body member to a trailer hitch component.

3. A trailer hitch adapter in accordance with claim 1, wherein the contact surfaces of the connecting member are substantially parallel to each other.

4. A trailer hitch adapter in accordance with claim 1, where in the contact surfaces of the connecting member are positioned substantially perpendicular to the housing longitudinal axis.

5. A trailer hitch adapter in accordance with claim 1, wherein the second bushing body has an axial length greater than the axial spacing between the second end of the connecting member and the projection to define an outer bushing body end spaced axially outwardly from the second end of the connecting member.

6. A trailer hitch adapter in accordance with claim 1, wherein the first bushing body has an axial length less than the axial spacing between the first end of the connecting member and the projection to define an outer end spaced axially inwardly of the first end of the connecting member.

7. A trailer hitch adapter in accordance with claim 1, wherein the housing includes at least one radially extending retaining aperture adjacent the second end thereof for receiving at least one retaining pin for connection of the adapter to one of a hitch ball holder and a hitch tongue.

8. A trailer hitch adapter in accordance with claim 1, wherein the bushing bodies are tightly carried on the connecting member, and have outer surfaces that are spaced inwardly of the inner surface of the housing.

9. A trailer hitch adapter in accordance with claim 1, wherein the bushing bodies have innermost ends that are defined by contact faces having a higher durometer value than that of the bushing bodies.

* * * * *